United States Patent [19]

Sodec et al.

[11] Patent Number: 4,580,381

[45] Date of Patent: Apr. 8, 1986

[54] FRAME

[75] Inventors: Franc Sodec, Würselen-Broichweiden, Yugoslavia; Werner Veldboer, Stolberg; Horst Wannagat, Herzogenrath, both of Fed. Rep. of Germany

[73] Assignee: H. Krantz GmbH & Co., Aachen, Fed. Rep. of Germany

[21] Appl. No.: 637,763

[22] Filed: Aug. 6, 1984

[30] Foreign Application Priority Data

Aug. 20, 1983 [DE] Fed. Rep. of Germany ....... 3330132

[51] Int. Cl.[4] ......................... E04B 5/52; B01D 50/00

[52] U.S. Cl. .......................................... 52/475; 52/28; 52/39; 52/656; 55/484

[58] Field of Search ..................... 52/28, 656, 475, 27, 52/39; 55/484; 98/40 DL

[56] References Cited

U.S. PATENT DOCUMENTS 2,313,687 3/1943 Walker et al. ...................... 52/28 X
3,418,915 12/1968 Marble ............................ 98/40 DL
3,750,374 8/1973 Neumann ............................ 55/484
4,088,463 5/1978 Smith ............................... 55/484 X
4,361,992 12/1982 Rapp ...................................... 52/28

*Primary Examiner*—Alfred C. Perham
*Assistant Examiner*—Jean M. LaKemper
*Attorney, Agent, or Firm*—Arthur B. Colvin

[57] ABSTRACT

Angular sections form frames which can be fitted together in the frame plane in modular fashion. Legs of the sections are formed so that through two interconnected legs of adjacent frames notches of T-shaped cross-section result, into which hammer head-shaped ends of pull rods can be introduced. By means of the pull rods, ledges can be pressed against filter and/or light fixture housings, which in this manner are pressed against legs of the profiles on the opposite housing side, adjacent frames thus make it possible in a correspondingly compact model to attach filters and light fixtures without the distance between two adjacent filters or between a filter and a light fixture occupying a width that would impair the flow profile of the air issuing from the filters.

3 Claims, 1 Drawing Figure

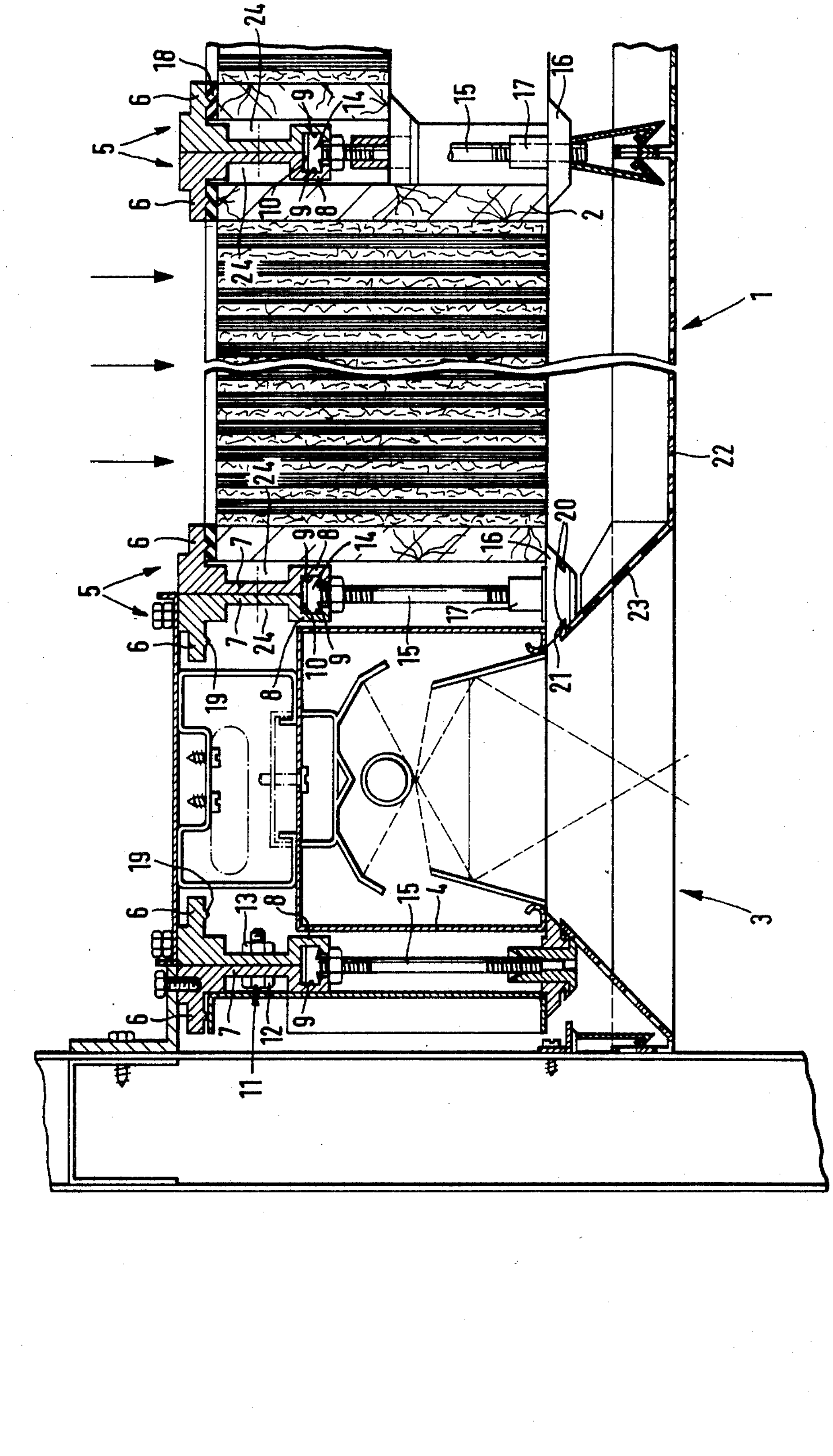
1
2
3
4
5
6
7
8
9
10
11
12
13
14
15
16
17
18
19
20
21
22
23
24

FRAME

The invention relates to a frame, designed as a modular element, consisting of a section of angular cross-section, for receiving a filter or a light fixture. The frame serves in particular as a modular element of a ceiling of a room traversed by clean air from the top down. Also the frame may serve as a modular element of a room wall or for the direct arrangement of filters on apertured walls of supply air ducts. In the case of such frames, a housing of the filter or of the light fixture is pressed against a leg of the section arranged parallel to the frame plane and pointing toward the interior of the room.

Known frames of this kind require between two filters to be arranged side by side, or between a filter and a light fixture to be arranged next to it, a distance which results from the addition of the width dimensions of two frame legs and from the space requirement for the press-on elements of the filter and light fixture housings. In order, for example, to aerate a room with clean air from the top down and to obtain as uniform a flow profile as possible, it is necessary to minimize the ceiling areas not having flow outlets. When using the known frame element, this requirement cannot be fulfilled sufficiently because of the space they take up.

It is the object of the invention to provide a frame to hold a filter or a light fixture which requires a very small distance between two adjacent filters or between a filter and a light fixture arranged next to it.

Taking as point of departure a frame of the initially described kind, it is proposed for the solution of the problem posed that a leg of the section arranged perpendicular to the frame plane and determining the outer frame circumference comprises an edge strip having an outwardly directed U-shaped notch. The notches of abutting frame sections define together a T-shaped groove opening outwardly into which groove ends of pull rods adapted to the groove cross-section, and preferably in the form of a T or hammerhead can be introduced. To the pull rods, there may be connected ledges which span the edge of adjacent filter or light fixture housings directed toward the room, whereby the housings can be pressed against the leg of the section arranged parallel to the room plane and pointing to the interior of the frame.

The frame of the invention thus permits cutting the width dimensions of legs of conventional frames approximately in half and does not require additional space for joining the press-on elements to the frame. Instead, legs of a very small width can be used for the frame of the invention, where interconnected legs of adjacent frames form a notch of T-shaped cross-section into which the hammer head-shaped ends of pull rods can be introduced. In this way the distance between two adjacent filters, or between a filter and a light fixture, can be kept very small, thereby greatly reducing the areas without flow outlets which cause the creation of dead spaces in terms of flow.

According to a variant of the invention, the leg of the section arranged perpendicular to the frame plane comprises a longitudinal groove or mutually spaced cutouts, in which nuts or heads of screw bolts which serve to connect adjacent frames can be sunk.

Owing to this design, the connecting means for the legs of adjacent frames require no additional space whereby the distance between two filters or between a filter and a light fixture would otherwise be increased.

Preferably the leg of the section parallel to the frame plane has a longitudinal bead of substantially triangular cross-section, against which the edge of a filter or light fixture box can be pressed with a high specific pressure per area, with interposition of a seal section, in a manner known in itself.

According to another variant of the invention, the ledges spanning the edge (toward the room) of adjacent filter or light fixture housings comprise on both sides longitudinal slits for supporting edge strips of a perforated cover plate.

The longitudinal slits of the invention in the ledges permit a very simple manner of attaching a perforated plate, which is arranged preferably spaced parallel to the side (toward the room) of a filter bow, to even out the flow of clean air issuing from the filter box.

If lastly, according to a further variant of the invention, both sides of the ledges are beveled, enclosing between them an angle of preferably 90°, it is possible to fasten to the ledges a perforated plate whose edge regions abuts on a beveled side of the ledge and that the part of the perforated plate parallel to the outlet plane of the filter is contiguous to the edge of the peripheral region toward the room. If a light fixture box is arranged next to a filter box, it is possible to fix a perforated plate thus preformed with an edge strip in the longitudinal slit of the ledge which lies on the side of the ledge pointing to the light fixture housing. Owing to this, a portion of the clean air will issue perpendicular to the plane of the angularly bent edge region of the perforated plate, through the latter, so that also the room portion covered by the light fixture housing is aerated with clean air right under the light fixture. This design thus greatly reduces the impairment in uniformity of a flow profile caused by the naturally outletless region because of the space requirement of a light fixture.

In the drawing, the modular arrangement of a filter next to a light fixture is illustrated in transverse section supported in the frame of the invention.

A filter 1 with a housing 2 and a light fixture 3 with a housing 4 form, for example, a portion of the ceiling of a room ventilated with clean air.

The housings 2 and 4 are received in frames formed of a section 5 of angular cross-section. A leg 6 of frame section 5 is arranged parallel to the frame plane and points toward the interior of the frame. A leg 7 of section 5 forms the lateral limitation of the frame.

A free edge strip 8 of leg 7 has a substantially U-shaped cross-section and forms a U-shaped notch 9 open toward the outside of the frame. Two notches 9 formed by two edge strips 8 come together to form a notch 10 of T-shaped cross-section. The sections 5 of two adjacent frames are connected together by screws 11, heads 12 or nuts 13 being sunk in a longitudinal groove in the legs 7.

In the notches 10 of T-shaped cross-section, formed in this manner by adjacent frames, there are contained ends 14 of pull rods 15 formed correspondingly like hammer heads i.e. of T-shaped cross-section. Ledges 16 with corresponding bores are applied on the pull rods 15 and can be pressed against the lower edges of the housings 2 and 4 by means of threaded sleeves 17. Thereby for example the upper edge of housing 2 is pressed via a seal 18 against a longitudinal bead 19 of triangular cross-section, of leg 6.

The ledges 16 are beveled on both sides in such a way that the side faces enclose an angle of 90°. In the beveled sides longitudinal slits 20 are provided, into which edge strips 21 of a perforated plate 22 are pressed. On the side toward the light fixture 3, an edge region 23 of the perforated plate 22 abuts on the beveled side of ledge 16 and is contiguous only at a distance from the outlet plane of filter 1 to the portion of the perforated plate 22 extending parallel to this plane.

By this design, a part of the clean air issuing from filter 1 is conducted into the room region under the light fixture 3, so that already at a relatively small distance from the outlet plane the flow profile in the room is evened out, even though inside the area taken up by the lamps clean air can of course not be introduced directly into the room.

Having thus described the invention and illustrated its use, what is claimed as new and is desired to be secured by Letters Patent in the United States is:

1. A frame structure for mounting in the ceiling or wall of a room, said structure comprising a pair of rectangular frame members, each said frame member being formed of four frame sections, a frame section of each of said frame members being disposed in back to back abutting relation to and being connection to a frame section of the other said frame member, said abutting frame sections each including a leg member extending in a direction normal to the plane of said frame members and having an outwardly open U-shaped notch, the notches of said abutting section together defining a generally T-shaped groove opening in a direction away from the plane of said fame members, generally T-shaped headed members insertable endwise into said groove, said headed members including a threaded portion accessible through said groove, pull rods having first ends threadedly connected to said threaded portions of said headed members, and locking ledges threadedly connected to the ends of said pull rods remote from said first ends, said ledges being shiftable on said rods toward and away from said frame members whereby to clamp housings between said frame members and ledges, said ledges including outwardly directed surfaces facing away from said frames, said surfaces of said ledges including laterally directed slits, the combination including cover plates having laterally inwardly directed lip portions supported in said slits.

2. A device in accordance with claim 1 wherein said outwardly directed surfaces of said ledges are beveled.

3. A device in accordance with claim 2 wherein the included angle between said beveled surfaces is substantially 90°.

* * * * *